Figure 1:
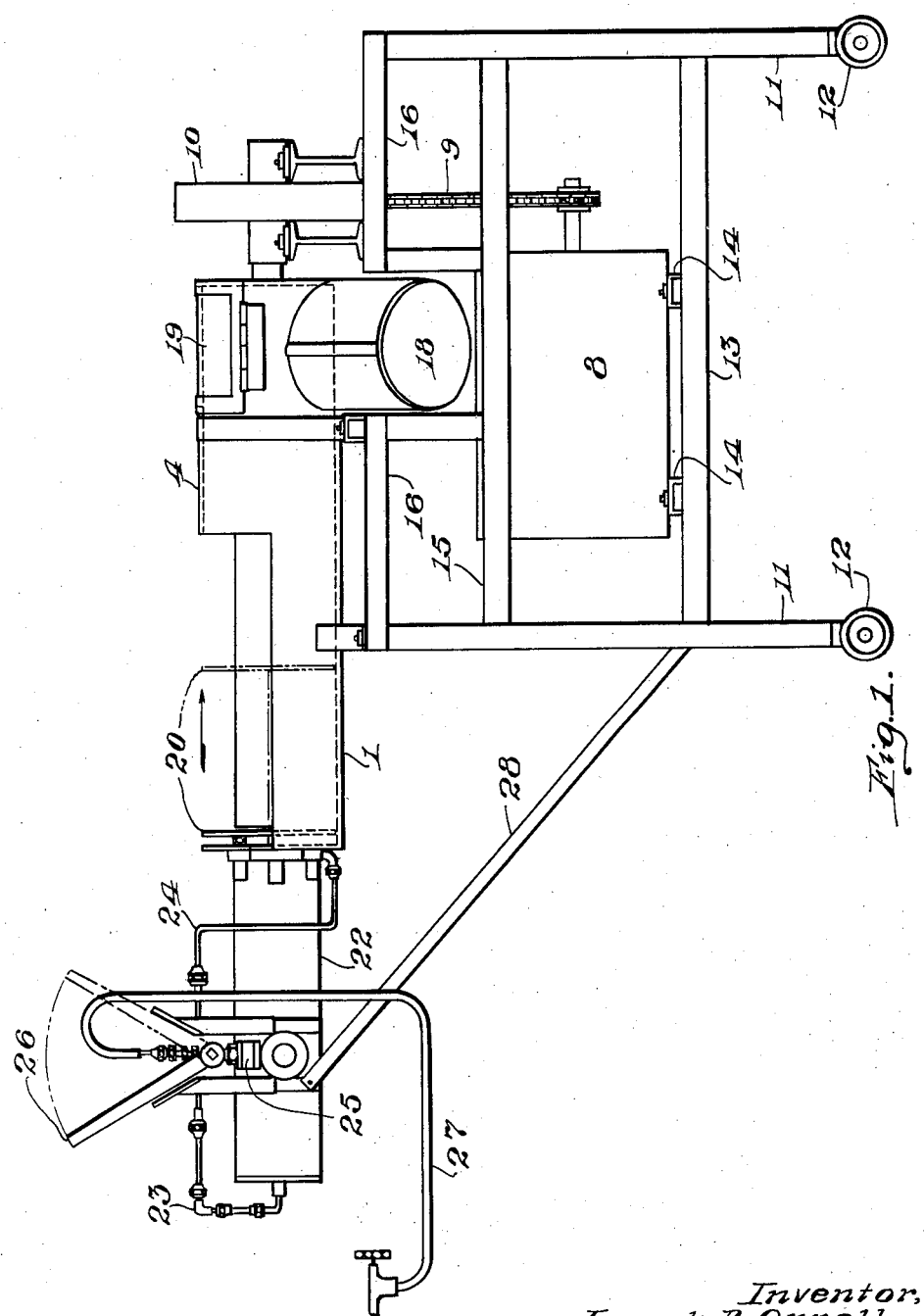

Aug. 16, 1949.                J. B. ORRELL                2,479,080
                   CONCENTRATED SWEET CREAM FAT GRINDER
Filed April 17, 1946                              3 Sheets-Sheet 1

Inventor,
Joseph B. Orrell,
by J. Stuart Freeman,
Attorney.

Aug. 16, 1949.  J. B. ORRELL  2,479,080
CONCENTRATED SWEET CREAM FAT GRINDER
Filed April 17, 1946  3 Sheets-Sheet 2

Inventor,
Joseph B. Orrell,
by J. Stuart Freeman,
Attorney.

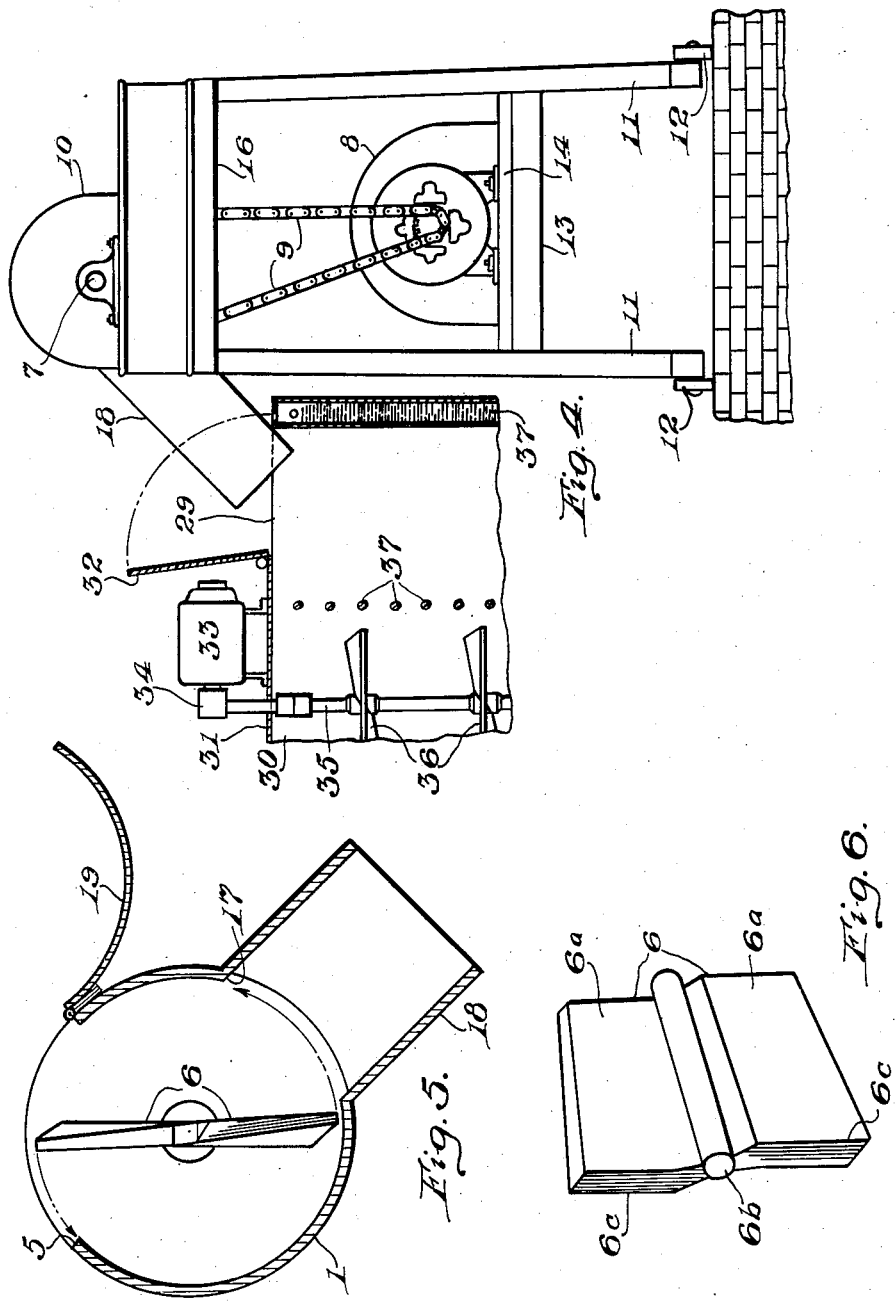

Patented Aug. 16, 1949

2,479,080

UNITED STATES PATENT OFFICE 2,479,080

CONCENTRATED SWEET CREAM FAT GRINDER

Joseph B. Orrell, Drexel Hill, Pa., assignor to Abbotts Dairies, Inc., Philadelphia, Pa., a corporation of Maryland Application April 17, 1946, Serial No. 662,689

2 Claims. (Cl. 146—113)

The object of the invention is to provide improvements in machines for grinding exceedingly hard substances, and particularly in grinding, shaving, or otherwise comminuting concentrated sweet fat or cream when solid and very hard at temperatures of about 20° F. or even lower.

In the manufacture of commercial ice cream, as for instance in the vicinity of Philadelphia, the large amounts of cream required makes it necessary to obtain it from relatively far distant sources, such for example as the highly productive dairy areas in Wisconsin and other Midwestern States. However, as whole milk includes all of 75% water, and such products can be shipped only in well refrigerated cars, the high freight rates that obtain make the shipment of such a large proportion of water prohibitive, wherefore the solids must be separated from the water, frozen and transported alone, the necessary amount of water being added at the ice cream plant in the form of whole or condensed milk, fruit juices, and the like. Separation of the cream from the original milk may be effected by any suitable means. This cream or milk solids is then reduced in temperature to about 20° F., at which point it can be safely shipped and stored without alteration of its physical, chemical and nutritional characteristics and values.

The formula of a high grade ice cream is quite complex at its highest state of development, and details that in other industries would be relatively if not entirely inconsequential assume great importance in their relation to the many other details involved. Thus, for example, not only is the timing of the addition of the solid cream to the mix important, but the condition of the cream at that time also assumes an importance that may not be readily appreciated.

To illustrate, heretofore hard frozen cream had had to be tempered, that is, softened, for a period of twenty-four hours, or thereabouts, at room temperature, in order to permit it to be cut into chunks for addition to the mix, or more completely thawed for addition in at least in semi-liquid form. If added in chunks, or lumps, protection must be provided for the agitator blades of the mixers, to say nothing of the extended time required for completely dissolving such lumps and mixing, while if added in liquid or semi-liquid form the taste of the final product is impaired, due to oxidation of the cream even under the most favorable conditions.

Consequently, it has been recognized for some time, that the ideal method of adding the frozen cream to the liquid mix would be to add it in such quickly thawable and dissolvable sizes as are represented by coarse cuttings, shavings and chips, at or very close to the low temperature mentioned, so as to prevent the slightest degree of oxidation prior to such addition.

Another object, therefore, is to provide an improved method of adding frozen, unoxidized cream to a liquid ice cream mix, which consists in chilling the cream immediately upon its separation from the whey, freezing the cream to a temperature of the order of 20° F. or thereabouts, and then chipping and/or coarsely cutting or shaving the solid cream directly into and dissolving and dispensing it throughout, a liquid ice cream mix, before it has been given the slightest opportunity to oxidize, even upon the surfaces of said chips or shavings.

And a still further object is to provide a grinding or shaving machine for the rapid communication and direct discharge of the solidly frozen cream into an ice cream mix, the speed of operation being such as to wholly prevent the oxidation of any part or portion of said frozen cream before it enters said mix.

When these objects in mind, the invention comprises further details of construction and operation, which are hereinafter fully brought out in the following description, when read in conjunction with the accompanying drawings, in which—

Figure 2:
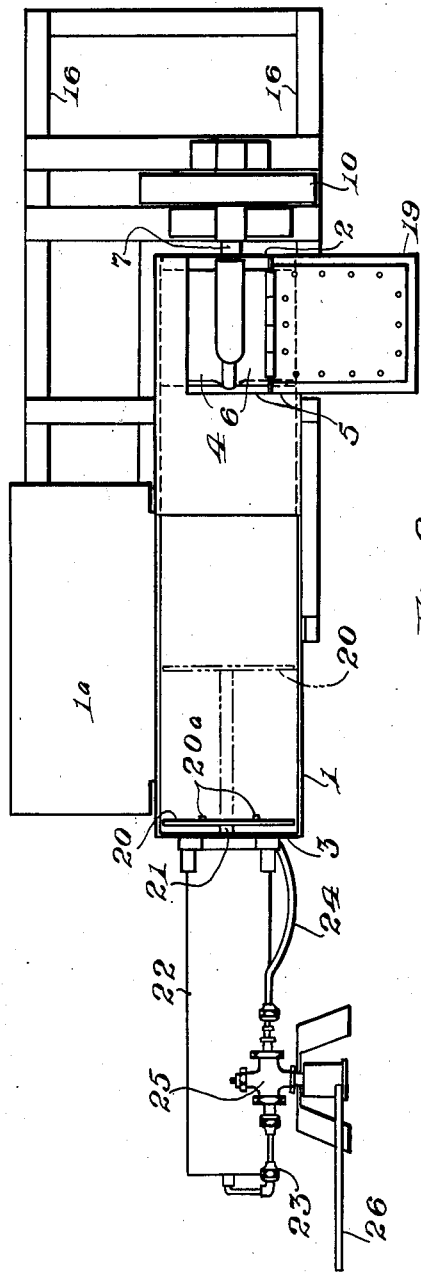
Figure 3:
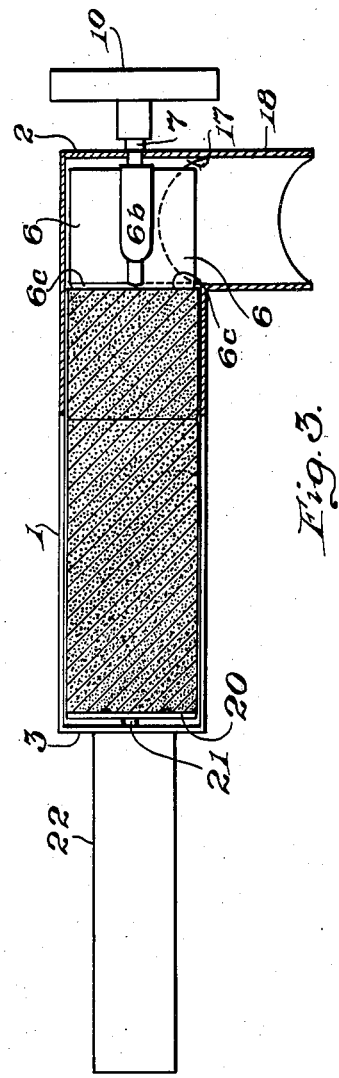

Fig. 1 is a side elevation of a device comprising one embodiment of the invention. Fig. 2 is a plan view of the same. Fig. 3 is a central longitudinal section of the same, showing two consecutive solid blocks of concentrated sweet fat or (or other substance) being forced through and against the rotary blades of the device; Fig. 4 is an end elevation of the device, shown in cooperation with the adjacent portions of a mixing tank; Fig. 5 is a vertical transverse section of the block-holding cylinder, the rotary blades therein and the discharge chute leading therefrom; and Fig. 6 is a perspective view of the rotary blades per se.

Referring to the drawings, there is provided a cylinder 1, closed at its forward and rear ends by walls 2 and 3, the rear portion of said cylinder being open upwardly for the unobstructed insertion of hard-frozen cylindrical blocks of concentrated sweet fat or cream, while the forward portion of said cylinder is closed by a curved top 4, having an opening 5 through which access can be had whenever desired to the rotary blades 6, carried by a shaft 7, which extends through the forward wall 2. Said shaft is driven by a suitable motor 8 through a sprocket chain 9 and reduction gearing within the housing 10, said motor, chain and gearing being of conventional form and design. Adjacent to the upper open portion of said cylinder, a laterally extending shelf 1a may be provided, if desired, to support a fresh block prior to its entering said cylinder.

At this point it should be noted that the device may be operatively supported upon any suitable type of stand, but the stand here shown for purposes of illustration consists of a plurality of upright legs 11, preferably provided with roller 12, and connected by a lower series of horizontally extending angles 13 supporting the motor 8 upon transversely extending channels 14. Additional angles 15 may be provided if desired between the level of said lower series and an upper series 16, which together form the top of the stand upon which rests the cylinder and reduction gearing referred to.

The blades 6 preferably comprise radially extending, aligned vanes 6a, integrally connected together through an intervening spindle 6b, while the rearward ends of said vanes terminate in oppositely directed cutting edges 6c, and the radially outer edges of said vanes either lightly scrape or closely approach the inner curved surfaces of the forward end portion of said cylinder. A discharge opening 17 is provided in a lower lateral portion of the forward part of said cylinder, said opening being of substantially the longitudinal extent of the vanes 6a, so that the latter while rotating at high speed function as blower elements to force comminuted solid fat or cream through said discharge opening and thence through a diagonally downwardly extending chute 18 connected therewith. The upper access opening of said cylinder is normally closed by an arcuate, hinged door 19.

Within said cylinder is a reciprocatory piston head 20, preferably provided with lugs or spurs 20a and carried by a piston rod 21, which is actuated in conventional manner by the fluid pressure cylinder 22, into which air under pressure or steam is led by means of pipes 23 and 24, through a valve 25 that is controlled by a manually shifted lever 26, from a source (not shown) connected to said valve through a single pipe 27. In well known manner, shifting said lever 26 from side to side functions to reciprocate the piston head to and fro, so as to thereby alternately force one or more blocks of solid fat or cream against said rotary blades and to withdraw said piston in the reverse direction, so as to permit additional blocks to be placed in said cylinder. It should be understood, however, that whereas manually controlled fluid-actuated means is shown, the forcing of blocks against said blades can be accomplished by a purely manually actuated piston head, if preferred, said blocks being prevented from rotating by engagement with said lugs or spurs 20a. In any case, the piston-actuating means, if projecting substantially beyond the limits of said frame support, may be partially supported by one or more diagonal braces 28, as indicated.

In order to carry out the improved method of adding solid concentrated sweet fat or cream at low temperatures to a batch of ice cream mix, the device herein described is placed in such position that the chute 18 extends into close proximity to the filling opening 29 of a mixing tank 30, which is closed at its top 31, except for said filler opening, which is intended to be closed by a trap door 32, as soon as the desired quantity of comminuted material is cut and blown thereinto. Upon the top 31 of said tank is a motor 33, which through a conventional bevel gear unit 34 rotates a vertical shaft 35, carrying propeller type agitating and mixing blades 36 within said tank, which latter may be maintained at a level temperature by means of a liquid jacket 37. Heretofore the addition of lumps of solid sweet fat or cream to the mix has resulted in damage to the blades 36, so that spaced rods 37 had to be provided in order to protect them. In existing tanks these rods may be retained, if desired, but are unnecessary in newly constructed tanks, for the reason that the new device so shaves, chips, or otherwise comminutes the extremely hard sweet fat or cream as to prevent such damage to the blades.

From the nature, construction and operation of the new device, it will be apparent that not only is improved comminution of hard-solid sweet fats and cream provided for, but that by using the device in close proximity to the mixing tank, substantially as herein described and illustrated, so improves the method of adding the frozen material to the mix, that there is no possibility of its becoming tempered in the slightest degree, although it readily softens, dissolves and is almost instantly intermixed with the contents of the mixing tank, as herein explained. Thus, we have both an improved device or machine for comminuting hard-frozen sweet fats or cream, and at the same time a method of so closely consecutively comminuting and adding such material to an ice cream mix, that no appreciable interval exists sufficient for the temperature of the solids to rise under average room temperatures from, the order of 20° F. to anywhere near the thawing point before entering and becoming immersed in the mix within the said mixing tank.

Having thus described my invention, what I claim and desired to protect by Letters Patent of the United States is:

1. A grinder for concentrated sweet fat or solid cream, comprising a cylinder having coaxially apertured end walls and an opening in its curved wall, a reciprocatory shaft extending through one of said apertures, a piston carried by the inner end of said shaft, and a combined cutter, scraper and centrifugal fan comprising a substantially planar rotatable element having substantially radially aligned cutting edges and a pair of oppositely directed, rectilinear scraping edges parallel with its axis of rotation, said cutting edges being operative to simultaneously cut a cylindrical block of solid sweet fat or cream as said block is forced by said piston towards said element, said scraping edges being operative to remove accumulation of comminuted material from the inner wall of said cylinder, while said element functioning as a fan impels the comminuted material through said opening, and means to rotate said element at high speed.

2. A grinder for concentrated sweet fat or solid cream, comprising a cylinder having a feed opening in its curved wall, a closure for said opening hingedly secured to said cylinder and operative to function as a temporary support for a solid block of fat or cream, the lifting of the free edge portion of said closure operating to permit such block to drop through said feed opening into said cylinder and thereafter span said opening, a reciprocatory shaft extending slidably through an aperture in one end wall of said cylinder, a power-driven shaft journaled through an aperture in the opposite end wall of said cylinder, and a combined cutter, scraper and centrifugal fan comprising a substantially planar element carried by said last-mentioned shaft and having substantially radially aligned cutting edges and a pair of oppositely directed, rectilinear scraping edges parallel with its axis of rotation, said cutting edges being operative to simultaneously cut a block of solid sweet fat or cream as such block is forced by said first-mentioned shaft towards said element, said scraping edges being operative to prevent accumulation of comminuted material upon the inner surface of said curved wall, while said element functioning as a fan impels the comminuted material through a discharge opening in said curved wall spaced from said feed opening.

JOSEPH B. ORRELL.

REFERENCES CITED

The following references are of record in the file of this patent:

UNITED STATES PATENTS

| Number | Name | Date |
| --- | --- | --- |
| Re. 20,952 | Smith | Feb. 3, 1931 |
| 684,975 | Bosman | Oct. 22, 1901 |
| 892,808 | Carr | July 7, 1908 |
| 915,460 | Moore | Mar. 16, 1909 |
| 1,305,484 | Mosca | June 3, 1919 |
| 1,866,842 | Curtis | July 12, 1932 |
| 1,977,320 | McKinney | Oct. 16, 1934 |
| 2,211,655 | Hilgers | Aug. 13, 1940 |
| 2,235,217 | Koch | Mar. 18, 1941 |
| 2,327,140 | Speirs | Aug. 17, 1943 |
| 2,412,203 | Brunkhurst | Dec. 10, 1946 |